(12) United States Patent
Bradley et al.

(10) Patent No.: US 7,682,504 B2
(45) Date of Patent: Mar. 23, 2010

(54) SYSTEM FOR GROWING CRUSTACEANS AND OTHER FISH

(75) Inventors: James E. Bradley, Ladoga, IN (US); Jeremy L. Bradley, Ladoga, IN (US)

(73) Assignee: Aqua Manna, LLC, Ladoga, IN (US)

( * ) Notice: Subject to any disclaimer, the term of this patent is extended or adjusted under 35 U.S.C. 154(b) by 223 days.

(21) Appl. No.: 12/028,097

(22) Filed: Feb. 8, 2008

(65) Prior Publication Data

US 2008/0210643 A1 Sep. 4, 2008

Related U.S. Application Data

(60) Provisional application No. 60/904,262, filed on Mar. 1, 2007.

(51) Int. Cl.
*A01K 63/04* (2006.01)
*B01F 3/04* (2006.01)

(52) U.S. Cl. ................ 210/167.26; 210/221.2; 210/416.2; 119/263

(58) Field of Classification Search ............ 210/167.21, 210/167.26, 170.09, 221.2, 416.1, 416.2; 119/261, 263

See application file for complete search history.

(56) References Cited

U.S. PATENT DOCUMENTS

| | | | |
|---|---|---|---|
| 2,275,428 A * | 3/1942 | Haldeman | 210/167.26 |
| 2,335,756 A * | 11/1943 | Haldeman | 210/318 |
| 3,295,681 A * | 1/1967 | Rubert et al. | 210/167.26 |
| 3,333,834 A * | 8/1967 | Brewster | 261/84 |
| 3,744,635 A * | 7/1973 | Horvath | 210/87 |
| 3,796,414 A * | 3/1974 | Winton | 261/29 |
| 4,086,306 A * | 4/1978 | Yoshinaga | 261/93 |
| RE30,038 E | 6/1979 | Sweeney | 119/2 |
| 4,495,891 A | 1/1985 | Dugan et al. | 119/2 |
| 4,559,902 A | 12/1985 | Mason et al. | 119/2 |
| 5,158,037 A | 10/1992 | Engelbart | 119/3 |
| 5,178,093 A | 1/1993 | Reese et al. | 119/3 |
| 5,205,237 A | 4/1993 | Skeggs et al. | 119/3 |
| 5,294,335 A | 3/1994 | Chiang | 210/169 |
| 5,397,466 A | 3/1995 | Lin | 210/170 |

(Continued)

FOREIGN PATENT DOCUMENTS

JP 63-171699 * 7/1988

*Primary Examiner*—Fred Prince
(74) *Attorney, Agent, or Firm*—Brinks Hofer Gilson & Lione (57) ABSTRACT

A recirculated marine aquaculture system for growing crustaceans within a body of water includes a wholly submerged chamber situated in the body of water having a filtering wall connecting the chamber floor and ceiling permitting water to flow from the water body into the first chamber while excluding particulate materials. A second chamber is situated above the first chamber having a plurality of water outlets below the body of water upper surface, and a top having an air inlet above the body of water upper surface. A stand pipe has an open lower end opening into the first chamber and a plurality of laterally directed openings into the top of the second chamber. An impeller coupled to the stand pipe moves filtered water from the first chamber through the laterally directed openings into the second chamber adjacent to the air inlet, the water exiting the second chamber into the body of water through the plurality of water outlets after mixing with air drawn in through the air inlet.

20 Claims, 4 Drawing Sheets

U.S. PATENT DOCUMENTS

| | | | |
|---|---|---|---|
| 5,558,042 A | 9/1996 | Bradley et al. | 119/226 |
| 5,660,142 A | 8/1997 | Van Rijn | 119/227 |
| 6,041,738 A | 3/2000 | Hemauer et al. | 119/226 |
| 6,056,873 A | 5/2000 | Hartley et al. | 210/90 |
| 6,254,769 B1 | 7/2001 | Whittaker | 210/95 |
| 6,318,292 B1 | 11/2001 | Sakai | 119/227 |
| 6,499,431 B1 | 12/2002 | Lin et al. | 119/226 |
| 6,659,043 B1 | 12/2003 | Huska | 119/226 |
| 6,764,597 B2 * | 7/2004 | Chauquet | 210/167.21 |
| 6,962,019 B1 | 11/2005 | McDougle | 43/57 |
| 7,024,814 B1 | 4/2006 | McDougle | 43/57 |
| 7,029,577 B2 | 4/2006 | Cummins | 210/169 |
| 7,100,535 B2 | 9/2006 | Cattin et al. | 119/245 |
| 7,134,293 B2 | 11/2006 | Rabal | 62/185 |
| 7,162,831 B1 | 1/2007 | Morton et al. | 43/57 |
| 7,293,658 B2 | 11/2007 | Cummins | 210/359 |

\* cited by examiner

Fig. 4

SYSTEM FOR GROWING CRUSTACEANS AND OTHER FISH

CROSS-REFERENCE TO RELATED APPLICATION

The present application is related to and claims all available benefits of U.S. provisional application Ser. No. 60/904,262 filed Mar. 1, 2007.

BACKGROUND OF THE INVENTION

The present invention relates to aqua culture systems for commercially raising fish, particularly crustaceans including, but not limited to, crayfish, crabs, lobster and shrimp.

In recent years the world has witnessed an alarming decline in commercial fisheries, the result of over fishing and environmental degradation. Over the years, many of the traditional sources for fish, i.e. lakes, rivers, streams, etc., have become contaminated with pollutants generated by the public. As a result, fewer fish are available in such sources; and, in addition, fish that are able to survive in the contaminated waters often themselves become contaminated and unfit for human consumption. According to the Food and Agriculture Organization (FAO) of the United Nations, nearly 70% of the world's commercial marine fisheries species are now fully exploited, overexploited or depleted. Based on anticipated population growth, it is estimated that the world's demand for seafood will double by the year 2025. Therefore, a growing gap is developing between demand and supply of fisheries products, which results in a growing seafood deficit. Even the most favorable estimates project that in the year 2025 the global demand for seafood will be twice as much as the commercial fisheries harvest.

It is very clear that the only way to meet the world's growing needs in fisheries products is through marine aquaculture systems—the farming of aquatic organisms in controlled environments. In response to the situation, global aquaculture production is expanding quickly. Aquaculture's contribution to the world's seafood supplies increased from 12 to 19% between 1984 and 1994. Worldwide, it is estimated that in order to close the increasing gap between demand and supply of aquatic products, aquaculture will need to increase production three-to-four-fold during the next two and a half decades. In this context, there is a compelling motivation to develop aquaculture systems of improved and commercially viable character for high volume production of aquatic species and environmental sustainability.

In an effort to eliminate the effects of marine aquaculture on the environment, and to optimize aquaculture production, an environmentally acceptable aquatic farming technology has emerged: the use of recirculated marine aquaculture systems (RMAS), in which the same water is continuously reused in operation of the system. These systems have many advantages over non-recirculating systems. Water re-use in the RMAS minimizes any adverse environmental burden created by the aquaculture system since there is minimal net waste material generation, and what waste is generated is easily handled by local sewer systems, or can be used as fertilizer. RMAS offer flexibility in location options including urban, rural, and inland, since they are not confined to coastal areas or open oceans. Unlike free-floating pens, process conditions can be better controlled within a RMAS.

RMAS typically include a container containing a large quantity of water in which the fish are raised, and a filtration system for cleaning the water in the container. Such filtration systems typically include a particulate filter and a bio-filter. The particulate filter is used to remove solid particulate materials, such as fish waste and uneaten food, from the water. The bio-filter contains bacteria which removes ammonia and nitrates from the water, and also is used to oxygenate the water. Various types of filters have been used as particulate filters in aquaculture, including rotating drum filters. The use of rotating drum filters in aquaculture, however, has been limited by their high cost, their need for frequent maintenance, and the difficulty in cleaning the filtering surface of the filtering media. The filtering surface must be continuously cleaned to prevent the filtering surface from being clogged by the particulate matter.

In general, aquaculture systems of the prior art are not well designed for use in connection with crustaceans. As a result, the commercial aquaculture systems developed to date are highly variable in efficiency and output of product. Such systems are subject to numerous processing and operational deficiencies, including: sub-optimal production of fish; absence of control of process conditions; process instability; susceptibility to environmental pathogens; susceptibility to pollution; loss of stock; and the lack of well-defined optimal conditions for achieving maximal growth and production of the aquatic species being raised in the aquaculture system.

Despite the various features and benefits of the structures of the prior aquaculture systems, there remains a need for a recirculated marine aquaculture system that is specifically designed for crustaceans, including, but not limited to, crayfish, crabs, lobster and shrimp. There remains a specific need for a low-cost system that can grow crustaceans from an early post larval stage to a market ready stage at a well defined time interval that can be repeatedly cycled for optimum return on the system investment.

SUMMARY OF THE INVENTION

These several needs may be satisfied by a recirculated marine aquaculture system that includes a water treatment unit that can be situated in a body or container of water such as a fisheries tank, pool, pond or lake. The water treatment unit includes a first chamber that can be situated below the surface of the water. A stand can be coupled to a bottom surface of the first chamber to space the first chamber above the bottom of the body of water. The first chamber has a floor, a ceiling situated above the floor, and a filtering wall connecting the floor and ceiling, the filtering wall permitting water to flow into the first chamber while excluding particulate materials. The filtering wall can completely surround and connect a perimetral edge of the chamber floor to a perimetral edge of the chamber ceiling. A gas bubble source can be situated adjacent a lower edge of the filtering wall to provide an upward sweeping flow of bubbles that can help maintain the outside of the filtering wall free from litter.

The water treatment unit also includes a second chamber situated above the first chamber. The second chamber has a base, a sidewall extending upward from the base, and a top that can be located above the water surface in the body of water. The second chamber base can be spaced above the first chamber ceiling, or can rest directly on the first chamber ceiling. The second chamber also has at least one water outlet in a lower portion of the second chamber, and an air inlet in an upper portion of the second chamber. The water outlet from the second chamber can take the form of one or more outlets through the second chamber base. A directionally adjustable pipe can be coupled to the outlet from the second chamber so that the outflow from the second chamber can be used to develop a desired flow pattern, such as a toroidal flow, within the body of water. An outlet can be provided in the second chamber upper portion to allow for withdrawal of excess foam and air enriched in carbon dioxide from the second chamber.

The water treatment unit also has a stand pipe coupled between the first chamber and the second chamber that has a lower end opening into the first chamber and an upper opening adjacent to the top of the second chamber. An impeller is connected to the stand pipe to move water from the first chamber through the upper opening of the stand pipe into the second chamber, which creates a head within the second chamber forcing water out through the water outlet in the lower portion of the second chamber. The impeller can take the form of a motor coupled to the stand pipe and a shaft coupled to the motor and to at least one propeller situated within the stand pipe below the water level in the body of water.

The water treatment unit stand pipe upper opening can be surrounded by a depending flange. The depending flange can intercept and downwardly direct water flowing from the upper opening of the standpipe. The downwardly directed water can entrains air coming through the air inlet in the upper portion of the second chamber to elevate the level of oxygen dissolved in the body of water. The downwardly directed water can also mix with water in the upper chamber in a turbulent manner to generate a surface foam containing biological byproducts and air with an elevated $CO_2$ level.

The water treatment unit can be used to move water from the body of water through the filtering wall of the first chamber, up through the stand pipe, and out through the laterally directed openings into the second chamber adjacent to the air inlet. The water moving out the laterally directed openings of the stand pipe, mixes with air drawn in through the air inlet to oxygenate the water, and the oxygenated water exits the second chamber into the body of water through one or more water outlets in the lower portion of the second chamber due to the head developed by the inflow of water into the second chamber. The outward flow of water from the second chamber can cause a toroidal flow of water within the body of water around the first chamber, the flow of water being a volume sufficient to provide a living environment for growing crustaceans or other fish within the body of water.

Spacing the first chamber floor above the bottom of the body of water can be seen to provide a zone of reduced circulation below the first chamber floor that can promote bacterial degradation of waste products. Providing a source of bubbles adjacent a lower outer edge of the first chamber filtering wall can provide an upward sweeping flow of bubbles across the filtering wall, which can maintain the filter outer surface substantially free from debris. Removing a fraction of gas from the second chamber containing an elevated level of $CO_2$ can be sufficient to maintain the water at a desired pH.

Other features of the present invention and the corresponding advantages of those features will become apparent from the following discussion of the preferred embodiments of the present invention, exemplifying the best mode of practicing the present invention, which is illustrated in the accompanying drawings. The components in the figures are not necessarily to scale, emphasis instead being placed upon illustrating the principles of the invention. Moreover, in the figures, like referenced numerals designate corresponding parts throughout the different views.

DESCRIPTION OF PREFERRED EMBODIMENTS

Figure 1:
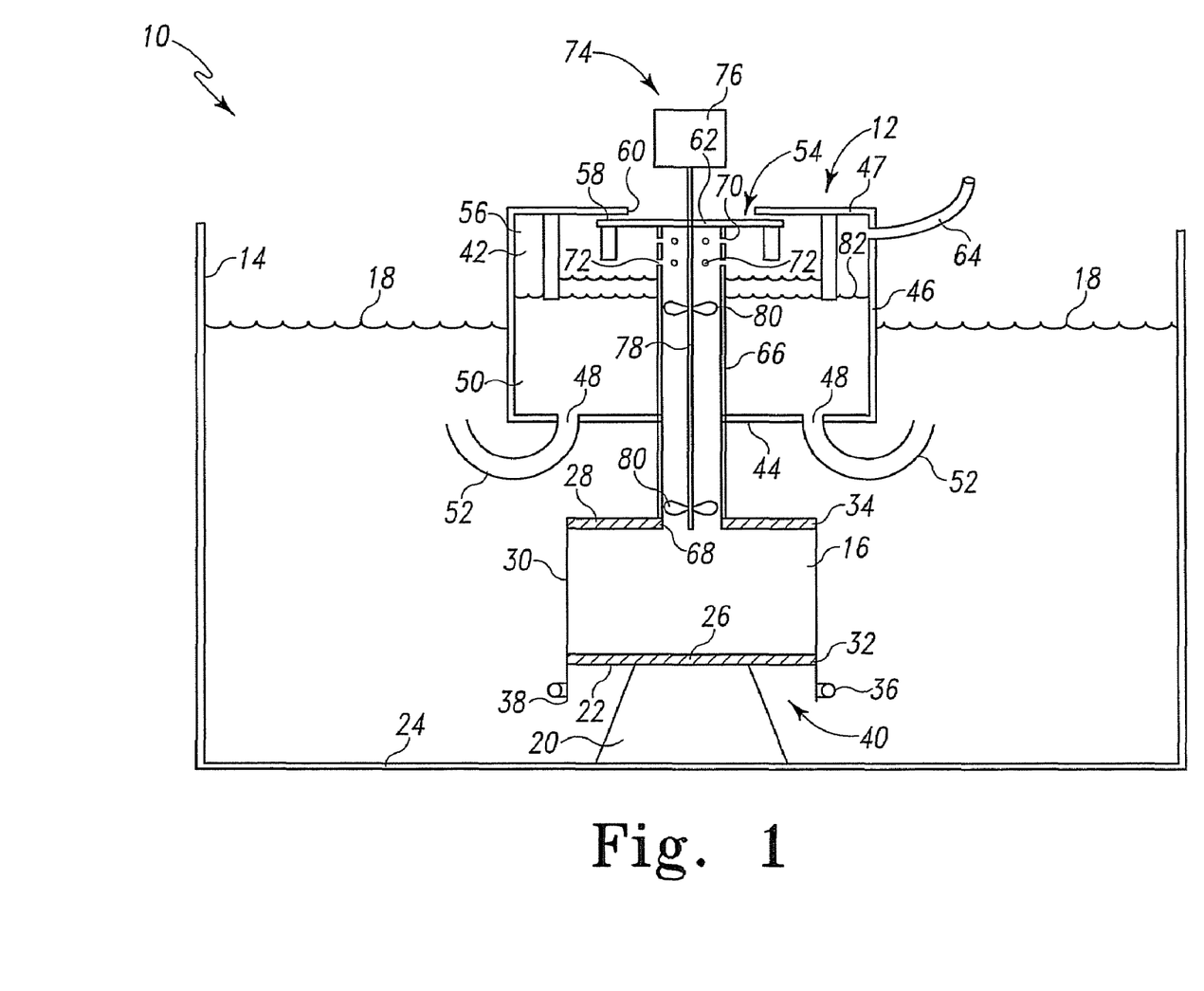
FIG. 1 is a schematic sectional view of a recirculated marine aquaculture system that includes a water treatment unit embodying the present invention.

A recirculated marine aquaculture system 10 is shown schematically in FIG. 1 that includes a water treatment unit 12 situated within a fisheries tank 14. The water treatment unit 12 can also be situated in a pool, pond, lake or other body of water with equal effect, and the illustration here of a tank 14 is not intended to be limiting in any way. The water treatment unit 12 has a first chamber 16 that is situated below the water surface 18 in the body of water 14. A stand 20 can be coupled to a bottom surface 22 of the first chamber 16 to space the first chamber 16 above the bottom 24 of the body of water 14. The first chamber 16 has a floor 26 and a ceiling 28 which are made of a material that is generally water impenetrable, such as stainless steel or fiberglass reinforced plastic. A filtering wall 30 connects the floor 26 and ceiling 28. The filtering wall 30 permits water to flow from the body of water in the fisheries tank 14 into the first chamber 16. The filtering wall 30 is made of a filtering material that will exclude the desired species of crustaceans or other fish from the first chamber 16, but will permit small particulate materials that may be present in the body of water 14 to pass into the first chamber 16. The filtering material can be a fine screen of stainless steel or a polymer. The filtering wall 30 can be in the form of discrete replaceable panels or in the form of a continuous wall that completely surrounds and connects a perimetral edge 32 of the chamber floor 26 to a perimetral edge 34 of the chamber ceiling 28. A gas bubble source 36 can be situated adjacent to a lower edge 38 of the filtering wall 30 to provide an upward sweeping flow of bubbles that can help maintain the outside of the filtering wall 30 free from litter. The gas bubble source 36 can be supplied by any conventional source of compressed air. The lower edge 38 of the filtering wall 30 can extend below the chamber floor 26 to provide a protected zone 40 under the chamber floor 26 for enhanced microbial activity to break down some of the waste products of any fish in the body of water 14.

The water treatment unit 12 also includes a second chamber 42 situated above the first chamber 16 as shown schematically in FIG. 1. The second chamber 42 has a base 44, a sidewall 46 extending upward from the base 44, and a top 47 that can be located above the water surface 18 in the tank 14. The second chamber base 44 can be spaced above the first chamber ceiling 28, or can rest directly on the first chamber ceiling 28. The second chamber 42 also has at least one water outlet 48 in a lower portion 50 of the second chamber 42. The water outlet 48 from the second chamber can take the form of one or more outlets 48 through the second chamber base 44. A directionally adjustable pipe 52 can be coupled to the outlet 48 from the second chamber 42 so that the outflow from the second chamber 42 can be used to develop a desired water flow pattern within the body of water 14. An air inlet 54 is provided in an upper portion 56 of the second chamber. The air inlet 54 can be in the form of a lateral slot 58 formed between a central opening 60 in the second chamber top 47 and a plate 62 situated immediately below the central opening 60, but in spaced relation from the second chamber top 47. An outlet 64 can be provided in the second chamber upper portion 56 to allow for withdrawal of excess foam and air enriched in carbon dioxide from the second chamber 42.

The water treatment unit 12 also has a stand pipe 66 coupled between the first chamber 16 and the second chamber 42. The stand pipe 66 has a lower end 68 that opens into the first chamber 16 and an upper opening 70 adjacent to the top 47 of the second chamber 42. The upper opening 70 of the stand pipe 66 can take the form of a plurality of openings 72 that can direct a flow of water laterally adjacent to lateral slot 58. An impeller 74 is connected to the stand pipe 66 to move water from the first chamber 16 up through the stand pipe 66 and out through the upper opening 70 of the stand pipe 66 into the second chamber 42. The impeller 74 can take the form of a motor 76, such as a ¾ HP electric motor, coupled to the stand pipe 66 and a shaft 78 coupled to the motor 76 and to at least one propeller 80 situated within the stand pipe 66 below the water surface 18 in the body of water in the fisheries tank 14. Suitable bearings can be provided between the shaft 78 and the plate 62, as well as at the lower end of the shaft 78 to ensure stability of the rotating shaft 78 with respect to the vertical center of the stand pipe 66. The size of the stand pipe 66, upper opening 70, motor 76, and propellers 80 are desirably selected so that between about 600 to 1000 gallons of water per minute can be pumped from the first chamber 16 into the second chamber 42.

The pumping of water from the first chamber 16 up through the stand pipe 66 causes water to be drawn through the filtering wall 30 into the first chamber 16. The pumping of water from the first chamber 16 into the second chamber 42 through the upper openings 70 causes the water to turbulently mix with air drawn in through the lateral slot 58, thereby increasing the level of oxygen in the water in the second chamber 42. The turbulent mixing also releases some carbon dioxide from the water within the second chamber 42 which can be removed through outlet 64. The pumping of water from the first chamber 16 into the second chamber 42 creates a head represented by the difference in level of the water surface 82 in the second chamber 42 as compared to the water surface 18 in the fisheries tank 14. A small difference in water level can also be observed between the areas inside and outside an inner wall 124. The head within the second chamber 42 forces some of the water in the second chamber 42 out through the water outlets 48 in the lower portion 50 of the second chamber 42. By suitably directing the directionally adjustable pipes 52 the water coming out the water outlets 48 can cause any desired water flow pattern within the fisheries tank 14. An upward flow out of the adjustable pipes 52 can cause a toroidal flow of water within the body of water 14 around the water treatment unit 12, the flow of water being of a volume sufficient to provide a living environment for growing crustaceans or other fish within the body of water 14.

Figure 2:
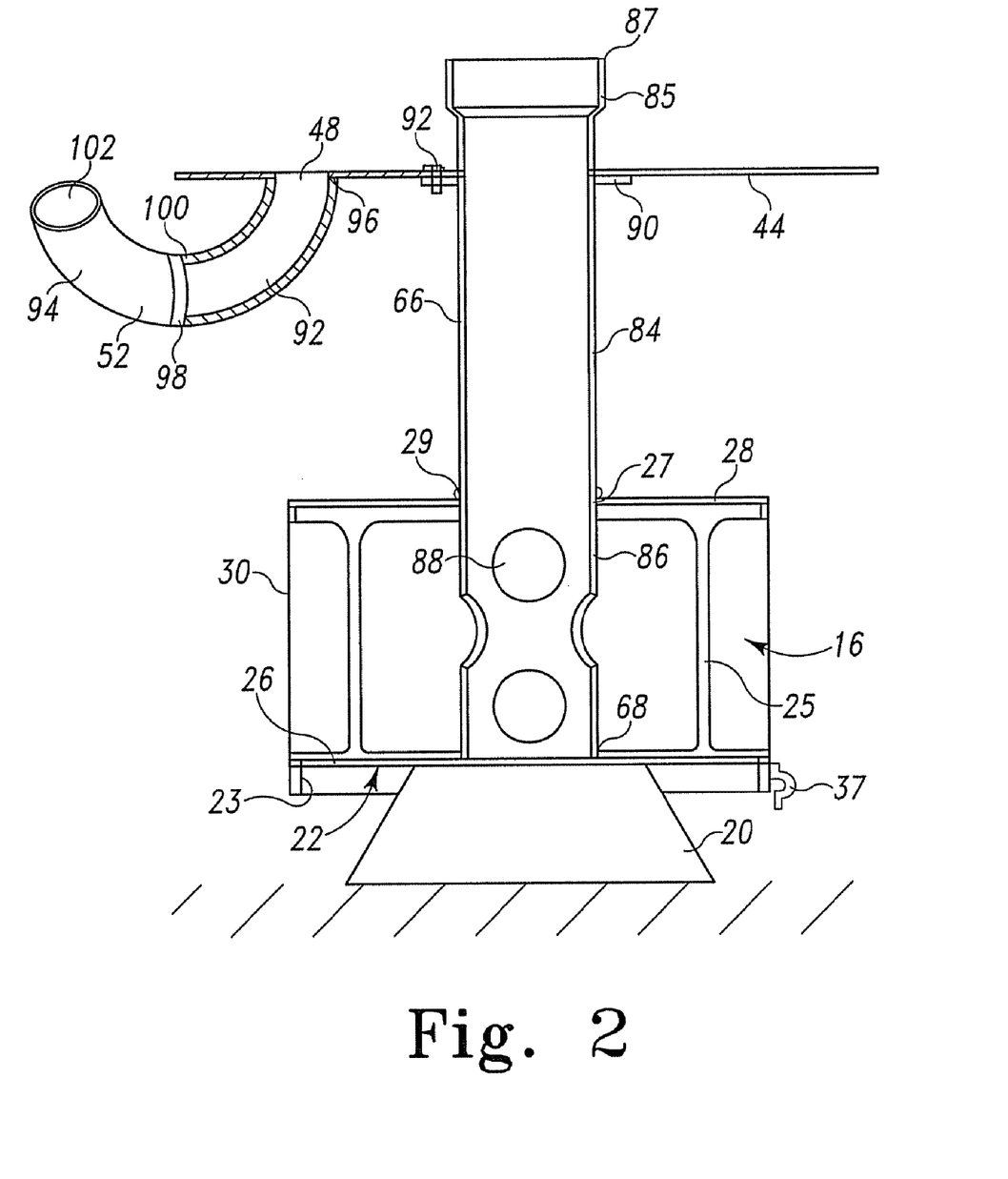
FIG. 2 is an elevation view, partially in section of a portion of a water treatment unit of the present invention.

Two sub-assemblies of the water treatment unit 12 are shown in FIG. 2. The first chamber 16 of the water treatment unit 12 has the ceiling 28 and the floor 26 connected by vertical ribs 25 that are located on the inside of the screen forming the filtering wall 30. The screen forming the filtering wall 30 can be clamped around the periphery defined by the ceiling 28, floor 26 and vertical ribs 25. The floor 26 also includes a down-turned peripheral flange 23, which in a preferred embodiment extends downward about 5 cm below the floor 26. The gas bubble source 36 can be attached to the peripheral flange 23 using a plurality of brackets or clamps 37 so that the bubble source 36 is situated adjacent to the lower edge 38 of the filtering wall 30. The first chamber 16 of the water treatment unit 12 is shown in section to reveal the stand 20 supporting the bottom surface 22 of floor 26. A lower portion 84 of the stand pipe 66 can be seen to extend downward below the ceiling 28 of the first chamber 16 so that a lower end 68 of the stand pipe 66 rests on the floor 26 of the first chamber 16. The portion 86 of the stand pipe 66 residing within the first chamber 16 includes a plurality of lateral intake openings 88 sized to permit an essentially un-restricted amount of water to flow from the first chamber 16 into the stand pipe 66. A coupling 85 can be provided at the upper end 87 of the lower portion 84 of the stand pipe 66 to facilitate the assembly to additional elements of the water treatment unit 12. A secondary screen can be provided immediately surrounding the stand pipe surface to trap organic debris in the first chamber 16. A high surface area filler can be added to a lower portion of the first chamber 16 to facilitate the digestion of any trapped organic debris.

The base 44 of the second chamber 42 is shown to be coupled to the lower portion 84 of the stand pipe 66 spaced some distance above the ceiling 28 of the first chamber 16. One or more flanges 90 can be cemented, bonded, or otherwise fixed to the stand pipe 66 and one or more fasteners 92 can penetrate the base 44 of the second chamber 42 and the flange 90 to secure the base 44 to the stand pipe 66. Thus the lower portion 84 of the stand pipe 66 and the base 44 of the second chamber 42 can be handled as a unit to permit easy assembly and disassembly of the water treatment unit 12. In particular, the portion 86 of the stand pipe 66 can slide into and be lifted out of the opening 27 in the ceiling 28 of the first chamber 16 to permit easy assembly and disassembly of the unit 12. A gasket or flange 29 can be situated on the stand pipe 66 to minimize or inhibit any inflow of water into the first chamber 16 at the junction of the ceiling 28 and stand pipe 66, thereby ensuring a proper filtering of the water through the filtering wall 30.

The pipes 52 coupled to the water outlets 48 in the base 44 of the second chamber 42 are shown to comprise a first pipe 92 and a second pipe 94. The first pipe has a first end 96 cemented, bonded, or otherwise fixed to the base 44 to receive water from the outlet 48. The second pipe 94 has a first end 98 coupled to the second end 100 of the first pipe 92, so that the second pipe 94 can be rotated to a desired position relative to the first pipe 92 whereby water exiting the second chamber 42 out through the second end 102 of the second pipe 94 can be variously directed to obtain desirable water current conditions within the body of water 14.

Figure 3:
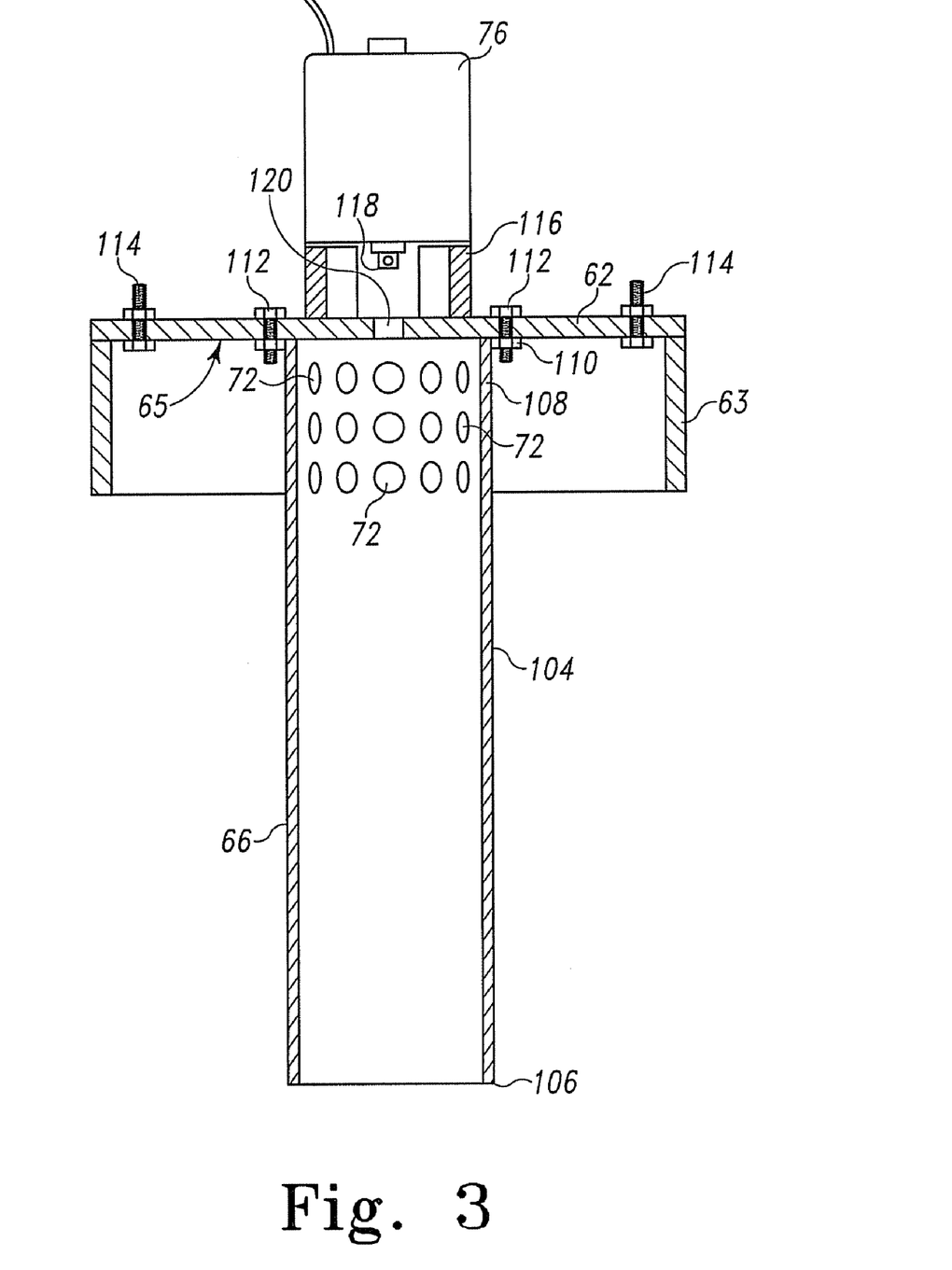
FIG. 3 is an elevation view, partially in section of another portion of a water treatment unit of the present invention.

A further sub-assembly of the water treatment unit 12 is shown in FIG. 3 that includes an upper portion 104 of the stand pipe 66, which is capped by plate 62. The lower end 106 of the upper portion 104 is intended to be coupled to the coupling 85 at the upper end 87 of the lower portion 84 of the stand pipe 66 shown in FIG. 2. The upper end 108 of the upper portion 104 can include a flange or tabs 110 that can be coupled to the plate 62 by means of fasteners 112. Additional fasteners 114 can be provided to define the size of the lateral slot 58 that creates the air inlet 54 to the second chamber 42 shown in FIG. 1. Arcuate mounting blocks 116 can be provided to mount the motor 76 above the plate 62 by a defined spacing. A coupling 118 can be provided to couple the motor 76 to a shaft 78. A suitable bearing 120 can be mounted to the plate 62 to receive the shaft 78. The openings 72 are seen to comprise three rows of openings that are substantially equally spaced around the upper portion 104 of the stand pipe 66 adjacent to the plate 62. A depending flange 63 can be provided on a lower surface 65 of the plate 62. The depending flange 63 can intercept and downwardly direct water flowing from the openings 72. The downwardly directed water entrains air coming through air inlet 54 to elevate the level of oxygen dissolved in the body of water 14. In a preferred embodiment the depending flange 63 can extending downward about 6 cm from the lower surface 65 of plate 62.

Figure 4:
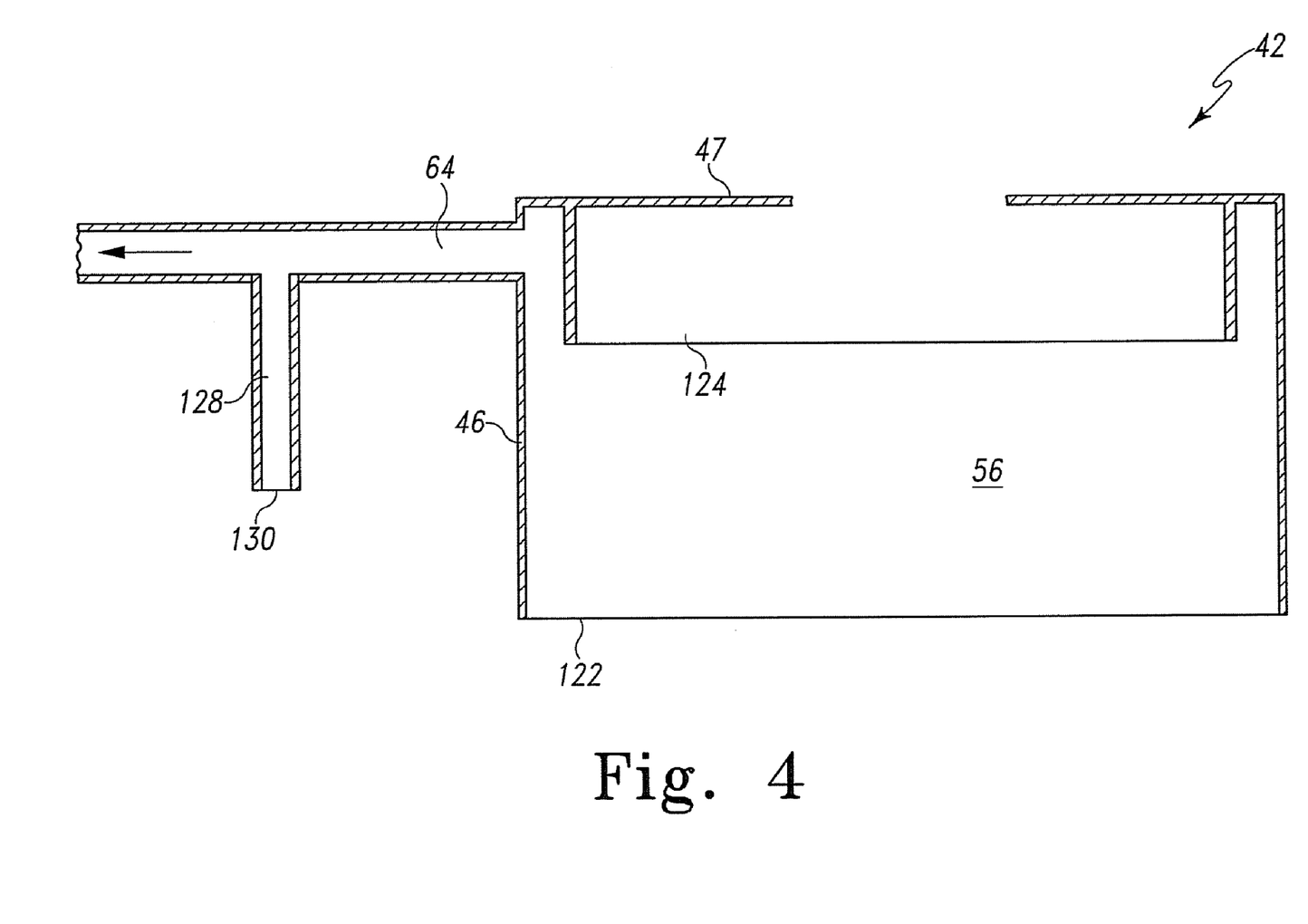
FIG. 4 is a sectional view of another portion of a water treatment unit of the present invention.

In FIG. 4, a further sub-assembly is shown that consists generally of the sidewall 46 and top 47 of the second chamber 42. The lower edge 122 of the sidewall 46 is intended to fit reasonably snuggly around the perimeter of the base 44 of the first sub-assembly so that water outflow from the second chamber is essentially entirely through the adjustable pipes 52 seen in FIG. 2. An inner wall 124 can be provided that depends from the top 47 generally in a uniformly spaced relation from the sidewall 46. A suitable space between the inner wall 124 and sidewall 46 has been found to be about 5 to 10 cm. The lower edge of the inner wall 124 can be located below the lower edge of the depending flange 63, and in a preferred embodiment can be located 1 to 5 cm below the water surface 82 within the second chamber 42.

During operation, the pumping of water the second chamber 42 through the upper openings 70 causes the water to turbulently mix with air drawn in through the lateral slot 58, thereby increasing the level of oxygen in the water in the second chamber 42, often creating a body of foam on the water surface 82. The inner wall 124 preferentially traps a significant, and generally dominant, portion of the foam between the inner wall 124 and the sidewall 46. An outlet 64 can be coupled to the space between the inner wall 124 and the sidewall 46 of the second chamber 56 to permit withdrawal of excess foam and air enriched in carbon dioxide from the second chamber 42. The outlet 64 can be aided by a suitable vacuum pump facilitating the withdrawal of the foam and carbon dioxide enriched air through the outlet 64. The outlet 64 can also include a downwardly extending water drain line 128 permitting the return of some of the water separated with the foam to the fisheries tank or other body of water 14. The water drain line 128 preferably extends downward so that a lower end 130 of the water drain line 128 is at least at or below the water surface 18 to ensure an adequate vacuum to facilitate withdrawal of the foam and carbon dioxide enriched air from the second chamber 56 through the outlet 64.

While these features have been disclosed in connection with the illustrated preferred embodiment, other embodiments of the invention will be apparent to those skilled in the art that come within the spirit of the invention as defined in the following claims. Further, it will be appreciated that in very large ponds or lakes, it may be convenient or necessary to employ two or more water treatment units 12 to ensure a total water flow volume sufficient to provide a living environment for growing crustaceans or other fish within the entire body of water 14.

What is claimed is:

1. A water treatment unit for treating water within a recirculated marine aquaculture systems fishery, the treatment unit comprising:
   a first chamber having a floor, a ceiling situated above the floor, and a filtering wall connecting the floor and ceiling, the filtering wall permitting water to flow into the first chamber while excluding particulate materials,
   a second chamber situated above the first chamber having a base, a sidewall extending upward from the base, and a top, the second chamber having at least one water outlet in a lower portion of the second chamber, and an air inlet in an upper portion of the second chamber,
   a stand pipe coupled between the first chamber and the second chamber, the stand pipe having a lower end opening into the first chamber, and an upper opening adjacent to the top of the second chamber, and
   an impeller connected to the stand pipe to move water from the first chamber through the upper opening into the second chamber, thereby creating a head within the second chamber forcing water out through said water outlet.

2. The water treatment unit of claim 1 further comprising a stand coupled to a bottom surface of the first chamber floor.

3. The water treatment unit of claim 1 wherein the filtering wall completely surrounds and connects perimetral edges of the first chamber floor and ceiling.

4. The water treatment unit of claim 1 further comprising a gas bubble source situated adjacent a lower edge of the first chamber filtering wall.

5. The water treatment unit of claim 1 wherein the second chamber base is spaced above the first chamber ceiling.

6. The water treatment unit of claim 1 wherein the at least one water outlet in the second chamber comprises a plurality of outlets through the second chamber base.

7. The water treatment unit of claim 1 further comprising a directionally adjustable pipe coupled to the at least one outlet from the second chamber.

8. The water treatment unit of claim 1 further comprising a gas outlet in the second chamber upper portion.

9. The water treatment unit of claim 1 wherein the impeller comprises a motor coupled to the stand pipe and a shaft coupled to at least one propeller within the stand pipe.

10. A recirculated marine aquaculture system for growing crustaceans and other fish comprising:
    a tank having a bottom and a side extending upward to a top edge, the tank containing a body of water, the body of water having an upper surface situated below the tank top edge,
    a first chamber situated in the tank having a floor, a ceiling situated above the floor and below the body of water upper surface, and a filtering wall connecting the floor and ceiling, the filtering wall permitting water to flow from the tank into the first chamber while excluding particulate materials,
    a second chamber situated above the first chamber having a base, a sidewall extending upward from the base above the body of water upper surface, the second chamber base having a plurality of water outlets below the body of water upper surface, and a top having an air inlet above the body of water upper surface,
    a stand pipe coupled between the first chamber and the second chamber, the stand pipe having an open lower end opening into the first chamber, a closed upper end, and a plurality of laterally directed openings adjacent to the top of the second chamber, and
    an impeller coupled to the stand pipe for moving water from the first chamber through the laterally directed openings into the second chamber adjacent to the air inlet, the water exiting the second chamber into the tank through the plurality of water outlets after mixing with air drawn in through the air inlet.

11. The system of claim 10 further comprising a stand coupled to the first chamber floor spacing the first chamber floor above the tank bottom.

12. The system of claim 10 further comprising a gas bubble source situated adjacent a lower outer edge of the first chamber filtering wall providing an upward sweeping flow of bubbles across the filtering wall.

13. The system of claim 10 further comprising directionally adjustable pipes coupled to each the plurality of water outlets from the second chamber.

14. The system of claim 13 wherein the first and second chambers are centrally positioned within the tank and the pipes coupled to the water outlets are adjusted to provide a toroidal flow of water around the first chamber.

15. The system of claim 10 further comprising a gas outlet in the second chamber upper portion for withdrawing a $CO_2$ enriched fraction of air from the second chamber.

16. The system of claim 10 wherein the filtering wall completely surrounds and connects radial outer perimetral edges of the first chamber floor and ceiling and includes a lip extending downwardly below the first chamber floor.

17. The system of claim 10 wherein the second chamber base and the first chamber ceiling are of similar size and the stand pipe spaces the second chamber base above the first chamber ceiling.

18. The system of claim 10 wherein the impeller comprises a motor coupled to the stand pipe upper end, a shaft coupled to the motor extending downward into the stand pipe, and a plurality of propellers coupled to the shaft within the stand pipe.

19. A method for growing crustaceans comprising the steps of:
    providing a container containing a body of water having a bottom and a side extending upward to a top edge located above an upper surface of the body of water;
    situating a first chamber in the container, the first chamber having a floor, a ceiling situated above the floor and below the body of water upper surface, and a filtering wall connecting the floor and ceiling, the filtering wall permitting water to flow from the container into the first chamber while excluding particulate materials;
    positioning a second chamber above the first chamber, the second chamber having a base, a sidewall extending upward from the base above the body of water upper surface, the second chamber base having a plurality of water outlets below the body of water upper surface, and a top having an air inlet above the body of water upper surface;
    coupling a stand pipe between the first chamber and the second chamber, the stand pipe having an open lower end opening into the first chamber, a closed upper end, and a plurality of laterally directed openings inside the second chamber adjacent to the top of the second chamber; and
    moving water from the first chamber up through the stand pipe and out through the laterally directed openings into the second chamber adjacent to the air inlet, the water exiting the second chamber into the water container through the plurality of water outlets after mixing with air drawn in through the air inlet, the outward flow of water from the outlets causing a toroidal flow of water within the container around the first chamber, the flow of water being a volume sufficient to provide a living environment for growing crustaceans within the container.

20. The method of claim 19 further comprising the steps of:
    spacing the first chamber floor above the container bottom to provide a zone of reduced circulation below the first chamber floor to promote bacterial degradation of waste products,
    supplying a flow of bubbles adjacent a lower outer edge of the first chamber filtering wall to provide an upward sweeping flow of bubbles across the filtering wall to maintain the filter outer surface substantially free from debris, and
    removing a fraction of gas from the second chamber containing an elevated level of $CO_2$ sufficient to maintain the water at a desired pH.

* * * * *